Aug. 17, 1948.  J. O'LEARY  2,447,428

AUTOMOBILE TIRE GUARD

Filed July 31, 1945

INVENTOR.
Jerry O'Leary
BY
Morton S. Bialman

Patented Aug. 17, 1948

2,447,428

UNITED STATES PATENT OFFICE 2,447,428

AUTOMOBILE TIRE GUARD

Jerry O'Leary, Cleveland, Ohio, assignor of one-fourth to M. B. Baubach, Norwood, Ohio Application July 31, 1945, Serial No. 608,010

11 Claims. (Cl. 301—38)

This invention relates to pneumatic tire guards, and particularly to side guards mountable on automobile wheels to protect the tires thereon from bruises or damage caused by deflation, abrasion or sudden side impact.

The primary object of this invention is to provide a light-weight side shield or guard for automobile tires which may be quickly and easily mounted on a conventional wheel.

Another object is to provide a durable and efficient device of the type stated that may be formed of sheet metal stampings for the reduction of weight thereof.

A further object is to provide such guard with novel embossed concentric rings or recesses and with radial ribs to enhance the appearance of the same and also to provide additional strength and rigidity.

These and other objects of the invention will become apparent from a reading of the following specification and claims, together with the accompanying drawing in which like parts are referred to and indicated by like reference characters and wherein:

Figure 1:
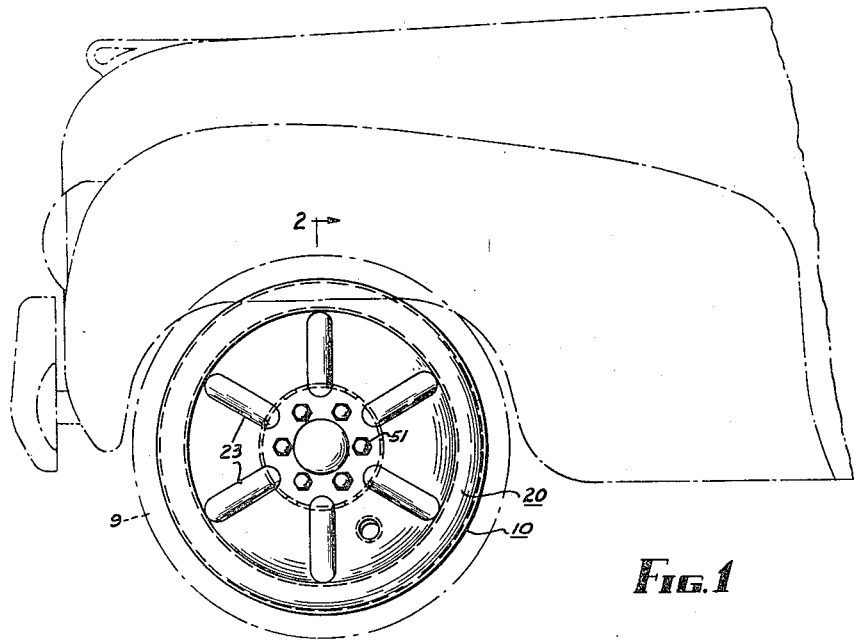
Figure 1 is a side view of the guard mounted on an automobile wheel.
Figure 2:
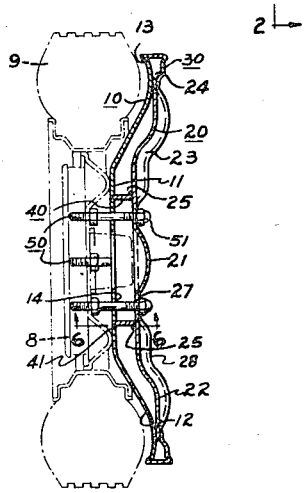
Figure 2 is a vertical cross-sectional view of the guard, taken along the line and in the direction of the arrows 2—2 of the Figure 1.
Figure 3:
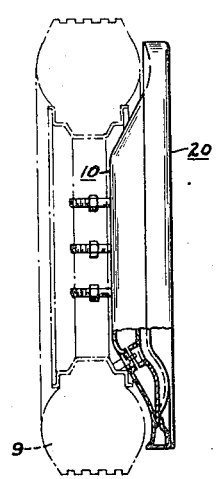
Figure 3 is an end view of the guard with parts thereof broken away to show construction and also to show the relative positions of the tire and guard when the tire is properly inflated.
Figure 4:
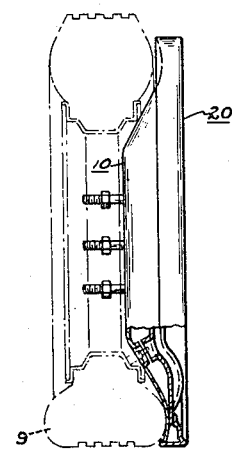
Figure 4 is a view similar to that of Figure 3 but showing the tire deflated and the guard resting on the roadway.
Figures 5, 6:
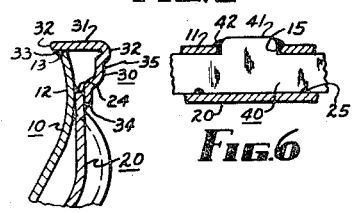
Figure 5 is an enlarged cross-sectional view of the peripheral portion of the guard showing the method of assembling parts thereof.
Figure 6 is a cross-sectional view of a part of the guard, taken along the line and in the direction of the arrows 6—6 of the Figure 2, and showing a portion of the hoop member mounted therein.
Figure 7:
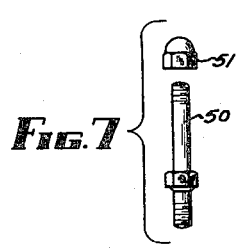
Figure 7 is an exploded view of the retaining means used to hold the guard on the wheel.

The instant invention consists primarily of four elements or members; namely, the plate member 10, the disk member 20, the ring member 30 and the hoop member 40. Each of these members will be described in detail and in the order set forth.

The plate member 10 consists of a sheet metal stamping, round in shape and formed with a flat central section 11 and a concave outer section 12. The outer section 12 is concentric with the flat central section 11 and has its recessed or concave side facing the tire 9. The flat center section 11 has a series of holes 14 evenly spaced around its axis, which receive the bolts 50 hereinafter described. A series of slots 15 are evenly spaced and concentric with the holes 14 which receive the tabs 41 of the hereinafter described hoop member 40. The diameter of the plate member 10 is slightly smaller than the diameter of the tire 9 on the wheel when normally inflated, and the circumferential edge 13 of the plate member 10 therefore is above the roadway.

The disk member 20 is also formed of sheet metal. It has a convex central portion 21, a convex circular portion 22 adjacent its circumferential edge 24 and a shoulder portion 28, between the central and circular portions 21 and 22 respectively. Recessed rings are therefore formed between the portions 21 and 28 and between 28 and 22. A series of radially extending recesses 23 is also formed in the member 20. These are referred to as rib portions and are indicated by the character 23. They extend through the shoulder portion 28, the convex outer circular portion 22 and the recessed ring therebetween. The ribs 23 resemble spokes of the wheel and make the device more rigid than it would be otherwise.

The circumferential edge 24 of the disk member 20 tightly abuts the side of the plate member 10, as shown in the drawing. A series of holes 27 are punched in the member 20 at the recessed ring portion between the shoulder 28 and the convex center 21. These holes 27 are aligned with the aforementioned holes 14 in the plate member and receive the bolts 50.

The ring member 30 fits around the circumferential edge 13 of the plate member 10 and is attached thereto. It is also attached to the disk member 20 just inside its circumferential edge 24. The ring member 30 has a peripheral tread surface 31, the inside of which overlaps the edge 13 of the plate member to form a bead 32 thereat, and is attached to the ring member by the welds 33. The outer edge of the surface 31 is rolled to form the second bead 32 and is formed with an outwardly curved or convex side wall 35. The inner edge of the side wall 35 is firmly attached to the disk member 20 by means of the welds 34. The ring member, when mounted on and welded to the plate and disk members as shown, forms a hollow wheel-like device.

The hoop member 40 fits between the plate and disk members and passes around the hereinafter mentioned bolts 50. Its outer edge is firmly attached to the inside wall of the disk member by means of the welds 25 as shown. The hoop member also has a series of tabs 41 on its inner edge which fit into the heretofore referred to slots 15 in the plate member. When all the elements and members are assembled, the tabs 41 are secured to the plate member by means of the welds 42. When thus assembled and finished, the hollow guard is sturdy, rigid and capable of supporting considerable weight and of withstanding hard bumps and blows.

The completed guard is mounted on the wheel 8 by means of the bolts 50 and the nuts 51. The bolts 50 fit into and engage the threaded holes which ordinarily receive the regular bolts which retain the wheel on the spindle.

The guard is designed and made so that its outer peripheral or tread surface is normally above the roadway and so that when the tire is inflated it does not touch the base or road. Only when the tire is deflated or depressed beyond the normal degree does it come in contact with the road. It is so designed and constructed that it will support the weight of the vehicle when the tire is deflated and thus prevent serious accidents in case the tire blows out or is suddenly deflated. The side portion of the guard, particularly the side walls 35 of the ring member and the convex portion 22 of the disk member, absorb side blows or bumps such as those caused by street curbs or heavy stones.

Having thus disclosed the invention in its preferred form, it should be understood that the device as described and illustrated is suggestive only as there may be other forms or modifications of the device which may come within the scope of the appended claims. It should be further understood that while the device has been illustrated for use on an automobile, wheels of other types of vehicles or airplanes may also be equipped with tire guards of this type.

I claim:

1. In combination with a wheel and tire thereon, a guard, comprising, a plate member having a circular recess capable of receiving the aforesaid tire, a disk member having embossed ribs thereon, a ring member integral with the plate and disk members and having a peripheral tread surface above the roadway when the aforesaid tire is inflated and on the roadway when the tire is deflated, and means for mounting the said members on the aforesaid wheel.

2. In combination with a wheel and tire thereon, a guard, comprising, a plate member having a circular recess capable of receiving the aforesaid tire, a disk member having embossed ribs thereon, a ring member integral with the plate and disk members and having a peripheral tread surface above the roadway when the aforesaid tire is inflated and on the roadway when the tire is deflated, a hoop member mounted between the plate and disk members and concentric with the said ring member, and threaded means for mounting the said members on the aforesaid wheel.

3. A guard of the type defined in claim 2 and further characterized by the ring member thereof having beaded portions extending laterally from the plate and disk members.

4. In combination with a wheel and tire thereon, a guard, comprising, a plate member having an edge portion therearound, a disk member spaced from the plate member and having an edge portion therearound, a ring member having a peripheral tread surface mounted on the said plate and disk members at the said edge portions, and threaded means for mounting the said members on the aforesaid wheel.

5. In combination with a wheel and tire thereon, a guard, comprising, a plate member having an edge portion therearound, a disk member spaced from the plate member and having an edge portion therearound, a ring member having a peripheral tread surface mounted on the said plate and disk members at the said edge portions, a hoop member mounted between the plate and disk members and concentric with the said ring member, and threaded means for mounting the said members on the aforesaid wheel.

6. A guard of the type defined in claim 5 and further characterized by the disk member having circular rings and radial ribs embossed thereon for rigidity thereof.

7. A wheel-like guard for pneumatic tire bearing wheels, said guard comprising a plate member having a generally convex outer surface, said plate member having a plurality of holes therein, a disk member of generally concave inner surface and convex outer surface secured to said plate member at the circumferential edges thereof and being substantially parallel thereto, a ring member having a cylindrical peripheral portion and a radially inwardly extending leg portion secured to said plate and disk members at the circumferential edges thereof to form a tread surface for the guard, a hoop having tabs formed on one edge thereof secured between said plate and disk members with the tabs extending through the holes in said plate member, and means for securing said plate and disk members to a pneumatic tire bearing wheel at the center portions of said members whereby the inner concave surface of said disk member can closely follow the contour of the wheel and pneumatic tire to form a compact assembly therewith.

8. A wheel-like guard for pneumatic tire bearing wheels, said guard comprising a plate member having a generally convex outer surface, said plate member having a plurality of holes therein, a disk member of generally concave inner surface and convex outer surface secured to said plate member at the circumferential edges thereof, a ring member secured to said plate and disk members at the circumferential edges thereof to form a tread surface for the guard, a hoop having tabs formed on one edge thereof secured between said plate and disk members with the tabs extending through the holes in said plate member, and means for securing said plate and disk members to a pneumatic tire bearing wheel at the center portions of said members whereby the inner concave surface of said disk member can closely follow the contour of the wheel and pneumatic tire to form a compact assembly therewith but with said ring member being radially inside the normal periphery of the pneumatic tire.

9. A wheel-like guard for pneumatic tire bearing wheels, said guard comprising a plate member having a generally convex outer surface, a disk member of generally concave inner surface and convex outer surface secured to said plate member at the circumferential edges thereof, a ring member having a cylindrical peripheral portion and a radially inwardly extending leg portion secured to said plate and disk members at the circumferential edges thereof to form a tread surface for the guard, a hoop secured between said plate and disk members, and means for securing said plate and disk members to a pneumatic tire bearing wheel at the center portions of said members whereby the inner concave surface of said disk member can closely follow the contour of the wheel and pneumatic tire to form a compact assembly therewith but with said ring member being radially inside the normal periphery of the pneumatic tire.

10. In combination with a wheel and tire thereon, a tire guard comprising, a cylindrical plate member having a flat central section and a convex outer section, said plate member having a circular recess capable of receiving the aforesaid tire, a convex disk member spaced from the plate member, said disk member having embossed rib portions thereon, a ring member integral with and connected to the circumferential edges of the plate and disk members, the said ring member having a cylindrical peripheral surface normally inside the peripheral surface of an inflated tire and being capable of riding a roadway when the tire is deflated.

11. In combination with a wheel and tire thereon, a tire guard comprising a plate member, a disk member having embossed ribs thereon, a ring member integral with the plate and disk members, a hoop member concentric with the circumferential edges of the plate member and mounted between the plate and disk members, and means for mounting the said members on a wheel.

JERRY O'LEARY.

REFERENCES CITED

The following references are of record in the file of this patent:

UNITED STATES PATENTS

| Number | Name | Date |
| --- | --- | --- |
| 283,397 | Innis | Aug. 21, 1883 |
| 1,515,144 | Charter | Nov. 11, 1924 |
| 1,904,081 | Pratt | Apr. 18, 1933 |
| 1,972,770 | Gillespie | Sept. 7, 1934 |
| 1,992,078 | Ludwick | Feb. 19, 1935 |

FOREIGN PATENTS

| Number | Country | Date |
| --- | --- | --- |
| 435,086 | Great Britain | Sept. 13, 1935 |